US006804700B1

(12) United States Patent
Terek et al.

(10) Patent No.: US 6,804,700 B1
(45) Date of Patent: Oct. 12, 2004

(54) METHODS AND SYSTEMS FOR ASSIGNING HUMAN-READABLE AND UNIQUE UNIFORM RESOURCE LOCATORS TO OBJECTS

(75) Inventors: Soner Terek, Bellevue, WA (US); Jon B. Avner, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 637 days.

(21) Appl. No.: 09/680,047

(22) Filed: Oct. 4, 2000

(51) Int. Cl.[7] .............................................. G06F 15/16
(52) U.S. Cl. ..................... 709/203; 709/217; 709/219; 715/501; 715/513
(58) Field of Search ................................. 709/203, 204, 709/217, 218, 219; 715/501, 513

(56) References Cited

U.S. PATENT DOCUMENTS

| | | | | |
|---|---|---|---|---|
| 5,878,219 A | * | 3/1999 | Vance et al. ................. | 709/217 |
| 5,918,012 A | * | 6/1999 | Astiz et al. .................. | 709/217 |
| 6,101,537 A | * | 8/2000 | Edelstein et al. ........... | 709/219 |
| 6,401,099 B1 | * | 6/2002 | Koppolu et al. ........ | 707/103 R |
| 6,532,492 B1 | * | 3/2003 | Presler-Marshall .......... | 709/223 |
| 6,542,933 B1 | * | 4/2003 | Durst et al. ................. | 709/229 |
| 6,574,675 B1 | * | 6/2003 | Swenson .................... | 709/316 |
| 6,581,059 B1 | * | 6/2003 | Barrett et al. ................. | 707/9 |
| 2002/0002569 A1 | * | 1/2002 | Nguyen et al. ............. | 707/515 |

* cited by examiner

Primary Examiner—Glenton B. Burgess
Assistant Examiner—Yasin Barqadle
(74) Attorney, Agent, or Firm—Workman Nydegger (57) ABSTRACT

A method and system for generating unique and human-readable URLs for objects included in a network system. When an object is created in a network system it may be that the application creating the object is unaware of URLs. However, it may also be that other applications included on the network system access object using URLs. When it is determined that an object needs a URL, one or more human-readable properties of the object are used to generate a URL. One or more storage locations associated with previously generated URLs are searched to determine if the human-readable properties of the object will generate a unique URL. If it is determined that the human-readable properties of the object will generate a unique URL, then a URL using the human-readable properties of the object is generated. However, if it is determined that the human-readable properties of the object will not create a unique URL, then the URL created using the human-readable properties is modified so that it is unique. Modification of the URL does not effect the human-readability of the URL. The method is configured so that modifications to future URLs generated from identical human-readable properties will still be unique.

20 Claims, 6 Drawing Sheets

METHODS AND SYSTEMS FOR ASSIGNING HUMAN-READABLE AND UNIQUE UNIFORM RESOURCE LOCATORS TO OBJECTS

BACKGROUND OF THE INVENTION

1. The Field of the Invention

The present invention relates to methods and systems for generating unique and meaningful Uniform Resource Locators (URLs) on a computer network. More specifically, the present invention relates to methods and systems for determining if an generated URL is identical to a previously generated URL and, if so, modifying the generated URL to be unique yet still meaningful to a reader.

2. The Prior State of the Art

The popularity of the Internet has profoundly improved the way people communicate by allowing users quick and easy access to information. By accessing the World Wide Web and electronic mail through computers and other devices, people now stay in touch with each other around the globe, and can access information on a wide variety of subjects.

The World Wide Web, in particular, allows efficient access to a virtually limitless store of information. The efficiency of accessing information on the World Wide Web is due in part to the use of an address scheme employing Uniform Resource Locators. Uniform Resource Locators, or URLs, are used to address all information on the World Wide Web. Each object on the World Wide Web is assigned a URL, which can be used to access the object. Typically, users transmit the URL to the server that contains the corresponding object, and then the server returns the corresponding object.

Due to the magnitude of the information already addressable using URLs and the efficiency with which the information can be retrieved using this addressing method, many applications are implemented to access objects using corresponding URLs to identify the object. Additionally, many applications generate URLs for associated objects so the objects may be accessed using a URL. However, there are still a large number of preexisting objects that are not assigned a URL since the objects were created by applications that do not have the functionality to assign URLs to objects.

As a result, applications were developed to assign URLs to objects where the applications that were used to create the object (i.e., the generation program) did not have the capability to make such a URL assignment. The generation programs would typically generate a unique identifier for an object and use this as part of the URL. These generation programs could create unique URLs that would function properly on the World Wide Web. However, one shortcoming of these URL generation techniques is that URLs are not generated in a format that is meaningful to a human reader. If a URL is not created in a format that expresses meaning to a human user, the user would typically have to open the object to determine the relevance of the object, thus wasting user time.

It is important with the ever-increasing amount of information available on the World Wide Web that URLs generated for objects are unique yet meaningful to a reader. Accordingly, methods and systems are desired for efficiently generating and assigning unique and meaningful URLs for objects.

SUMMARY OF THE INVENTION

The present invention relates to an efficient and automated method for creating unique and meaningful URLs to identify objects. When an object has been created and a URL must be generated for the object, one or more object properties that are characteristically descriptive of the object (or descriptive portions thereof) are included in the generated URL. Including the descriptive property of an object in the URL allows the URL to be meaningful and human readable so that a human may derive the characteristics of an object from the URL itself rather than having to open the object. A hashing index may be used to more efficiently search for existing URLs in order to detect and prevent the creation of non-unique URL names. The present invention is also capable of generating unique URLs for previously existing objects. This generation may be performed, for example, when replicating the previously existing objects, or perhaps when upgrading the system that manages the objects.

At the time an object is created, it is often beneficial to generate a unique and meaningful URL for the object. In accordance with embodiments of the invention, a hashing function may be used to efficiently perform a search to determine whether a tentative URL already exists. Also, the human-readable properties of the object are used to insure that the generated URL is meaningful to a reader. In absence of these acts, a non-unique or non-meaningful URL may be generated. This could create an ambiguous reference to the object or confuse a user as to the identity of the object.

In operation, when an object is created, a descriptive property of the object is accessed. For example, for an electronic mail message, the subject field of the electronic mail message is characteristically descriptive of the electronic mail message as a whole. Thus, when assigning a URL to an electronic mail message, the subject field may be accessed.

Then, it is determined whether or not including at least the descriptive portion of the property in a generated URL would result in a generated URL that is unique if incorporated using a first set of rules. For example, this might be efficiently accomplished by hashing the human-readable property using a hash function. The resulting hash value is compared to hash values associated with previously created objects included in a hash index. If the hash value is not found in the hash index, a human-readable URL is generated for the object, the URL including at least the descriptive portion of the human-readable property associated with the object. However, if the hash value is found in the hash index, the URL associated with the hash value is looked up. The URL from the lookup is compared to what the new URL would be it were actually generated (hereinafter called, "the tentative URL"). By performing the search based on a hash value, instead of the entire original value, the search has become more efficient in terms of processing resources.

In the unlikely event that the looked up URL and the tentative URL are not identical, searching of the hash index is continued. However, if the two URLs are identical, then a second set of rules is used to incorporate the descriptive portion of the human-readable property into the URL. For example, a postfix, which is associated with the hash value, may be appended to the newly generated URL to make it unique. The appended postfix does not affect the readability or descriptiveness of the generated URL. When a postfix associated with a hash value is used to make a URL unique, the postfix is then modified in a way that makes it distinguishable from previously used postfixes associated with the hash value. Using distinguishing postfixes insures that when URLs are generated for future objects with an identical hash value, the URLs will be unique.

The method is also capable of generating unique and meaningful URLs for numerous objects simultaneously. It is often the case that when a system is upgraded or objects are replicated, that there are a large number of objects for which URLs must be generated. Creating hash values and searching a hash index for a large number of objects at once would create a strain on the processor resources of the associated computer and network systems. However, since objects are created using unique object identifiers, unique and meaningful URLs can still be generated. In the case of large numbers of objects, URLs are generated by appending the unique object identifier for each object to human-readable properties of each object.

Therefore, the principles of the present invention may be applied to created unique, human-readable URLs for objects that were not previously assigned URLs. This allows applications that recognize URLs to access and otherwise identify even those objects that may have been created by applications that lack the ability to assign URLs to newly created objects.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to both methods and systems for automatically generating unique and human-readable URLs for objects in a network system. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media, which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
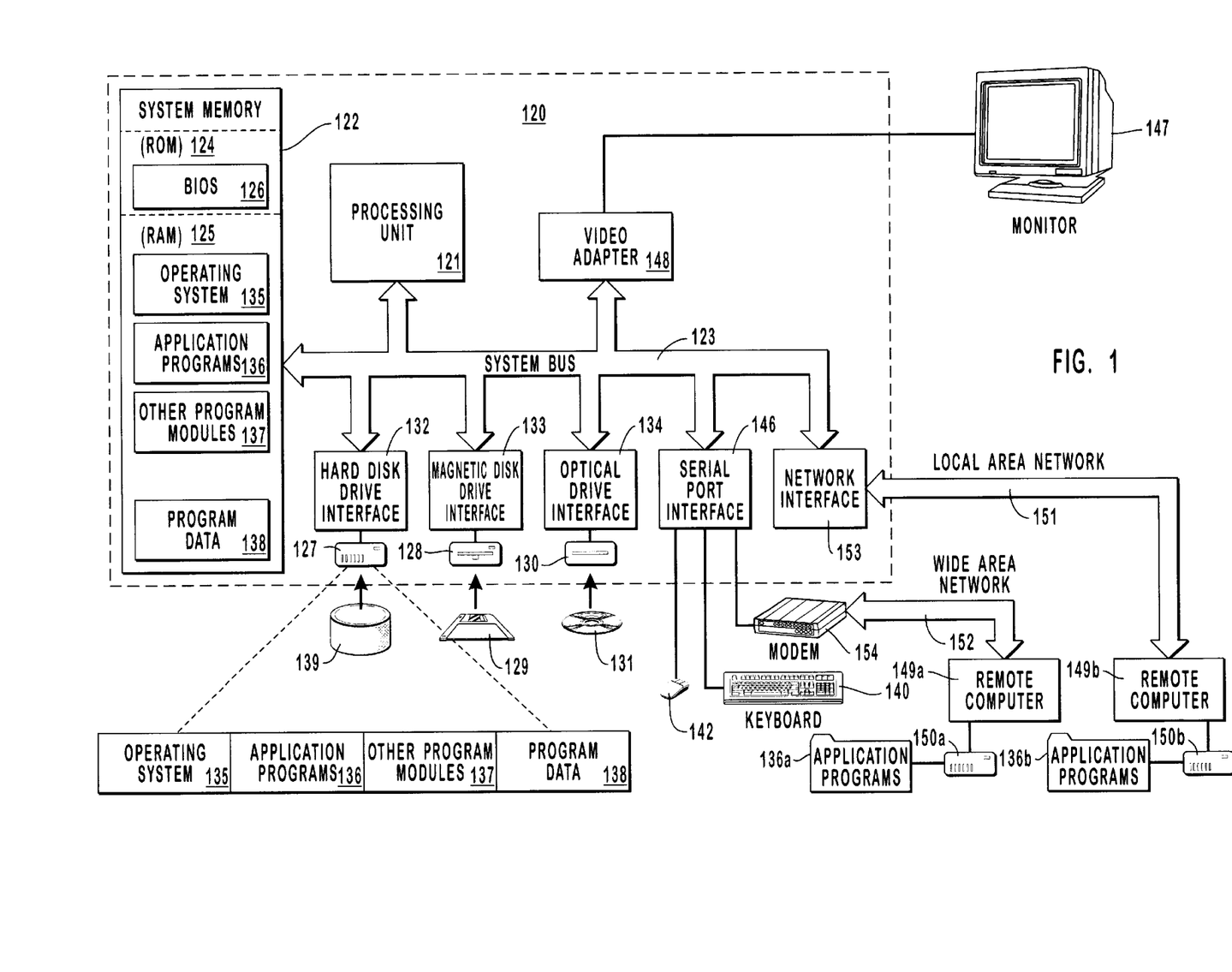
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

In this description and in the following claims, a "computer" is defined as a general-purpose or special purpose computer or any other computing device including, but not limited to, various computer hardware components including those illustrated in FIG. 1. A "computer system" is defined as a group of one or more computers that interact to cooperatively perform one or more functions. A "network system" is defined as a plurality of interconnected computer systems and other devices that might be interconnected to computer systems.

A "client system" is defined as a computer system, group of computer systems, other devices that might be associated with a network system, or combination thereof, that use the services of another computer system. A "server system" is defined as a computer system, group of computer systems, other devices that might be associated with a network system, or combination thereof, that provide services to another computer system Note that a computer system may use the services of another computer system and yet still provide services to other computer systems. Thus, a client system in one context may also be a server system in another context. Similarly, a server system in one context may also be a client system in another context. This principal is applicable to all embodiments of the present invention.

An "interface" is defined as anything that allows two separate entities to communicate. For example, two computer systems included on a network system may communicate over an interface, including communication protocols, such as Transmission Control Protocol and User Datagram Protocol. However, an interface may also allow communication between hardware components, for example those illustrated in FIG. 1, and software components, including, but not limited to, operating systems, application programs, other program modules or program data. Additionally, an interface may allow communication between software components including, but not limited to, communication between an operating system and an application program. Although the methods for creating unique and human readable URLs can be practiced with substantially any interface, the invention will be described herein below in the context of specific interfaces. However, it should be understood that the general principles described herein may be adapted for use with other interfaces.

Figure 2:
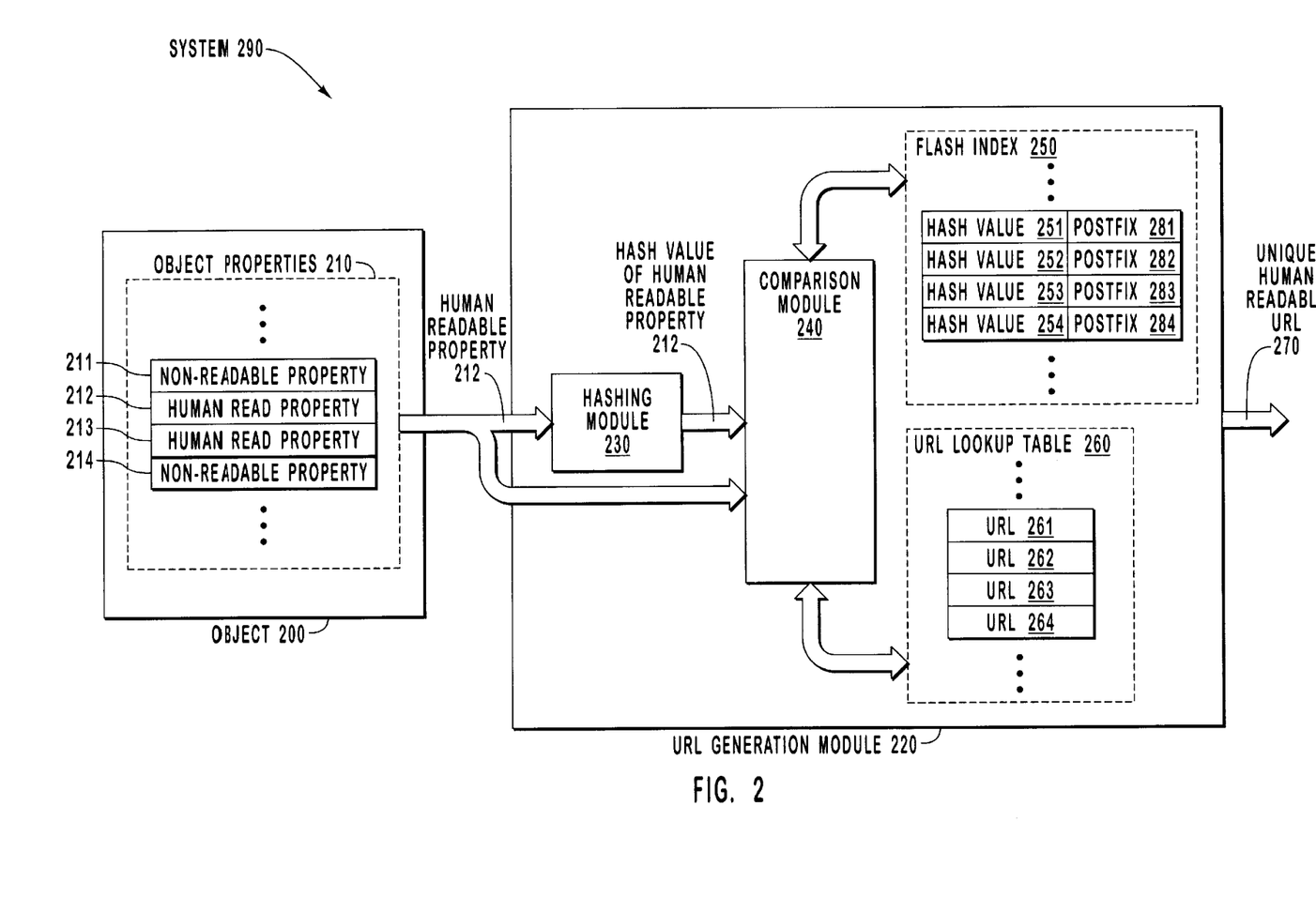
FIG. 2 illustrates some of the functional components present in a system where a unique and human-readable URL is generated for an object.

Show in FIG. 2, object 200 and URL generation module 220 are included in system 290. System 290 can be a network system such as an Ethernet, token ring, Arcnet, or any other network, or combination thereof, including the Internet, by which URL generation module 220 can receive information about object 200. The system 290 may also be a computer system in which the object 200 and the URL generation module 220 are included within the same computer system, or perhaps even the same computer. Although the methods of accessing information according to the invention can be practiced with substantially any system 290, the invention will be described herein below in the context of the Internet and the World Wide Web.

Object 200 can be any type of object, including, but not limited to, a folder, a message or an attachment. Included in object 200 are object properties 210. Object properties 210 may be human-readable properties or non-readable properties and may include, but are not limited to, folder display names, message subjects, attachment file names, or unique object identifiers. By way of example, for this illustrative embodiment, object properties 210 include non-readable property 211, human-readable property 212, human-readable property 213 and non-readable property 214.

In this description and in the claims, a "human-readable property" is a property of an object that characteristically is known for describing, at least in general terms, the content of the object. For example, electronic mail messages typically have a subject field or "line" in which the general subject of the electronic mail message is included. Also, a file or an attachment may include a file name field that is typically descriptive, at least is a summary fashion, of the content of that file or attachment.

URL generation module 220 is associated with hashing module 230, comparison module 240, hashing index 250 and URL lookup table 260. Hashing module 230 receives human-readable properties associated with objects, performs a hashing function on the properties, which converts them into a hash value, and outputs the hash value. The hash value can include formats such as numeric, alpha, or alphanumeric. Software for use as hashing module 230 is well known in the art.

Comparison module 240 receives a human-readable property associated with an object and also a hashed value of that property. Comparison module 240 may search to determine if a received hash value is included in hash index 250. Hash index 250 includes a list of hash values corresponding to previous human-readable properties that were used to create unique URLs. Additionally, each hash value in hash index 250 is associated with a postfix, which may be used to generate a unique URL. Included in hash index 250 are hash values 251, 252, 253, and 254 and associated postfixes 281, 282, 283, and 284.

URL lookup table 260 includes a list of URLs previously generated using human-readable properties of objects. Comparison module 240 may access URL lookup table 260 to determine if a URL is already in existence and therefore would not be unique It is possible that object 200 and URL generation module 220 are included in the same computer system or network device. However, this is not required. Object 200 and URL generation module 220 may be included on different computer systems or network devices associated with system 290. Additionally, while hashing module 230, comparison module 240, hashing index 250 and URL lookup table 260 are illustrated as being included in URL generation module 220, this is not required. Any of the functional components of URL generation module 220 may reside on different computer systems or network devices associated with system 290.

When it is determined that a URL should be generated for an object, such as object 200, one or more human-readable properties associated with the object are received by hashing module 230. By way of example, in FIG. 2, human-readable property 212 is received by hashing module 230. Hashing module 230 converts human-readable property 212 to a hash value. Then, human-readable property 212 as well as its hash value are received by comparison module 240.

While only one human-readable property is received and one hash value is output in the embodiment shown in FIG. 2, there is no limitation on the number of human-readable properties that may be received or the number of hash values that may be generated in order to create a given URL. The embodiment in FIG. 2 also illustrates comparison module 240 receiving human-readable property 212 directly from object 200. However this is also not required. In alternative embodiments, the properties of object 200 may be transmitted by other modules included on system 290. The properties of object 200 may be included in URL generation module 220, or even included in comparison module 240. Additionally, there is no chronological order in which comparison module 240 must receive human-readable properties or hash values for an object.

In another alternative embodiment (not shown, but with reference to the components of FIG. 2), the hash value of human-readable property 212 is itself stored as a property of object 200. In this embodiment, a hashing function would convert human-readable property 212 to a hash value and store the hash value as a property of object 200. Execution of the hashing function would be done prior to the need for generating a unique and human-readable URL. When it is determined a URL for object 200 must be generated, comparison module 240 would receive human-readable property 212 as well as its hash value without the need for intermediate processing such as that performed by hashing module 230. This embodiment serves to balance the processing load on associated computer systems as human-readable properties may be hashed during periods of reduced processor load.

It may also be the case that the human-readable property is modified before it is received by hashing module 230. The present invention may parse the human-readable property so that only portions of the human-readable property are received by hashing module 230. For instance, some operating systems automatically perform operations based on an object's extension. By way of example, when the human-readable property is an attachment filename, it is often desirable to preserve the filename extension. The attachment filename is parsed and the attachment file name extension is not received by hashing module 230. There is a wide range of instances when a human-readable property may be parsed. Although the invention is described here in the context of an attachment filename, it should be understood that the general principles described may be adapted for use with any type of human-readable property.

Referring back to the operation of the embodiment in FIG. 2, once comparison module 240 has received human-readable property 212 as well as the hash value for human-readable property 212, it searches to determine if the hash value for human-readable property 212 is included in hash index 250. Comparison module 240 may search by comparing the hash value for human-readable property 212 to all the hash values included in the hash index, including hash values 251, 252, 253 and 254. This and other methods for a comparison module to search a hash index, including a backwards search on a hash index, are well known in the art. If the hash value for human-readable property 212 is not included in hash index 250, a URL is generated for object 200 that includes at least a descriptive portion of human-readable property 212. Object 200's URL will be unique and readable since the hash value for human-readable property 212 was not included in hash index 250, and because the URL includes at least a descriptive portion of human-readable property 212.

However, if the hash value for human-readable property 212 is included in hash index 250, then a search of URL lookup table 260 is performed since a match in hashed values does not necessarily guarantee that the URL is already in use. Thus, a tentative URL for object 200, including at least a portion of human-readable property 212 is generated. URL lookup table 260 is then searched to determine if this tentative URL is included as a previously generated URL in URL lookup table 260. The search compares the tentative URL for object 200 to all the previously generated URLs in URL lookup table 260, including URLs 261, 262, 263, and 264. If the tentative URL for object 200 is not included in URL lookup table 260, a URL is generated for object 200 that includes at least a descriptive portion of human-readable property 212. Object 200's URL will be unique and readable since the representation of the URL for object 200 was not included in URL lookup table 260 and because it includes at least a descriptive portion of human-readable property 212.

In an alternative embodiment, comparison module 240 may store the location in the hash index where the hash value for human-readable property 212 was found. If a subsequent search of URL lookup table 260 determines that the tentative URL for object 200 has not been previously generated, comparison module 240 resumes searching hash index 250 adjacent to the location where the hash value for human-readable property 212 was previously found. Comparison module 240 searches hash index 250 until it finds another inclusion of hash value for human-readable property 212, or until it determines that the hash value is not included in the remaining unsearched portion of hash index 250. If the hash value for human-readable property 212 is not included in the hash index, a unique and readable URL may be generated using any of the above-mentioned methods If the tentative URL for object 200 is included in URL lookup table 260, other acts are performed to make it unique and readable. Since each hash value in hash index 250 has an associated postfix, this may be used to make a URL unique. When a URL for object 200 is generated, the postfix associated with the hash value for human-readable property 212, is appended to human-readable property 212. The associated postfix is then modified so that if a future hash value for a human-readable property of an object is identical to the hash value for human-readable property 212, a unique URL may still be generated. Methods for modifying a value so that it always unique when compared to previous values, including numerically incrementing the value each time it is used, are well known in the art. A URL is then generated for object 200 that includes at least a descriptive portion of human-readable property 212 and the appended postfix. Object 200's URL will be unique and readable since the URL includes a unique postfix and because it includes at least a descriptive portion of human-readable property 212.

Figure 3:
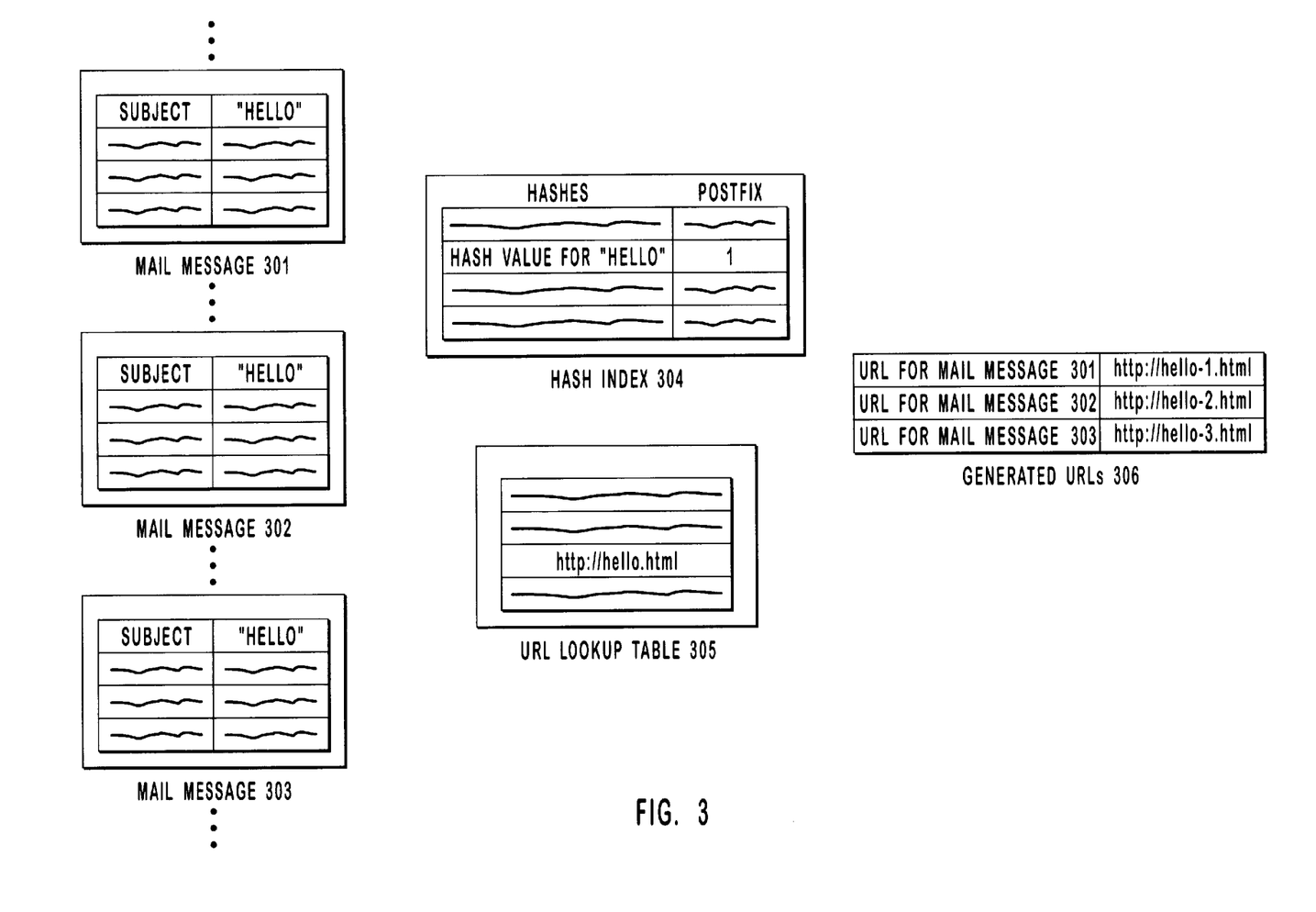
FIG. 3 is an exemplary representation of data structures used in generating URLs in accordance with the present invention.

FIG. 3 is an exemplary representation of possible URLs generated by the present invention. Three objects, mail messages 301, 302, and 303, are associated with a plurality of properties including the "subject" property, which is characteristically a human-readable property for electronic mail messages. In this example, each of the three mail messages 301, 302 and 303, have the identical subjects, "hello." Initially, hash index 304 includes the hash value for "hello", and a postfix of "1" is associated with this hash value. URL lookup table 305 includes the previously generated URL "http://hello.html." In this embodiment, tentative URLs are first generated using a first set of rules by appending "http://" to the front of a human-readable property and ".html" to the end of the human readable property.

When the URL for mail message 301 is to be generated, it is determined that the hash value for "hello" is included in hash index 304 and that the tentative URL "http://hello.html" is included in URL lookup table 305. Since "http://hello.html" would be the URL generated for mail message 301 using the first set of rules, something must be done to distinguish the tentative URL from the previously existing URL. To distinguish the tentative URL, a second set of rules is then followed to create the URL so as to guarantee uniqueness of the resulting URL. In one example, this is accomplished by a postfix associated with the hash value for "hello" being appended to the human-readable property "hello." In this example, since the postfix for the hash value of hello is "1", the second set of rules would result in including "hello-1" in the newly created URL (e.g., http://hello-1.html).

The postfix associated with the hash value for "hello" is then incremented to "2." The same procedure is followed for generating the URLs for mail messages 302 and 303. The generated URLs for mail messages 301, 302 and 303 are shown in generated URLs 306. After URLs for mail messages 301, 302 and 303 are generated, the postfix value associated with the hash value for "hello" is "4." Additionally, the newly generated URLs may be included lookup table 305.

Although the method in FIG. 3 discusses only the use of mail messages as objects, the invention can be practiced with substantially any type of object, including, folders, attachments or other objects that include one or more human-readable properties. Additionally, practice of the invention does not require the human-readable property to be "subject." Folder display names, file names or unique identifiers, as well as other human-readable properties of objects, work equally as well. It should be understood that the general principles described herein can be adapted for use with any object that has one or more associated human-readable properties.

Figure 4:
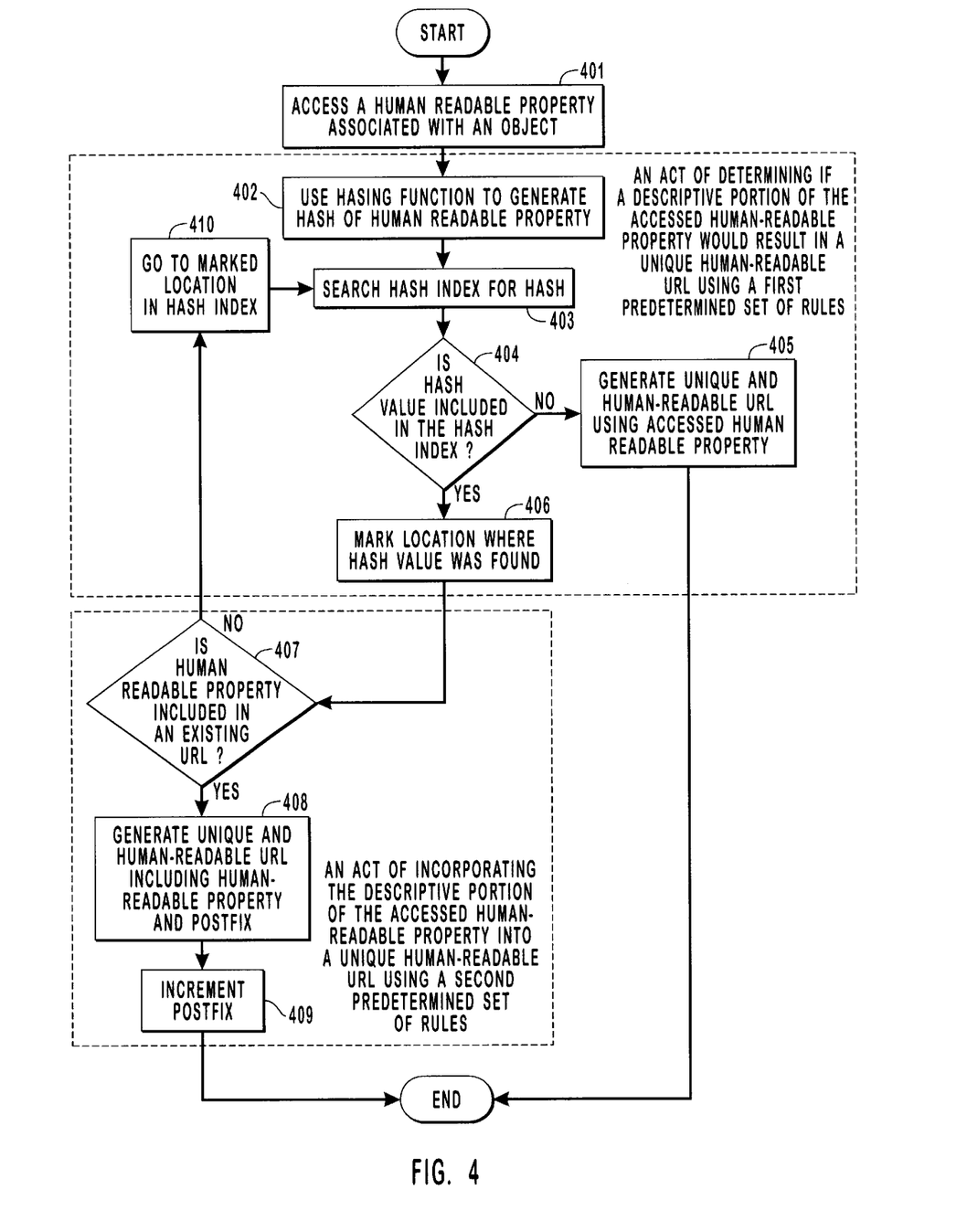
FIG. 4 is a flow diagram illustrating a method of generating a unique and human-readable URL for an object.

FIG. 4 illustrates a flowchart of a method for generating a unique and human-readable URL for an object. First, a human readable property associated with an object is accessed (act 401). After performing act 401, embodiments within the scope of the present invention may also include an act of determining whether or not using at least a descriptive portion of the accessed human-readable property would result in a unique human-readable URL when the human-readable property is incorporated into the URL according to a first predetermined set of rules. This may include using a hashing function to generate a hash value for the human-readable property (act 402) and searching a hash index for the created hash value (act 403). If the hash value is not included in the hash index (NO in decision block 404), this means that the human-readable property may be incorporated into the URL using the first set of rules and still result in a unique URL. Accordingly, the method proceeds to act 405, where a unique and human-readable URL is generated using the accessed human-readable property following the first set of rules. For instance, in the above example, "http://" was added before and ".html" was added after the subject "hello" in order to form "http://hello.html".

If the hash value is included in the hash index (YES in decision block 404), then there is no guarantee that using the first set of rules to create the URL would result in a unique URL. Accordingly, the location in the hash index where the value is included is marked (act 406).

After performing act 406, embodiments within the scope of the present invention may include an act of incorporating the descriptive portion of the human readable property into a human-readable URL using a second predetermined set of rules, the second predetermined set of rules guarantying that the generated URL is unique yet still human-readable. This may include determining if the accessed human-readable property is included in an existing URL (decision block 407). If so, (YES in decision block 407), then using the first set of rules would not result in a unique URL. In this case, the second set of rules is followed to create the URL.

This second set of rules may include appending a postfix to the human-readable property, the postfix associated with the hash value stored at the location in the hash index marked in act 406 (act 408). After generation of the URL using the second set of rules, the postfix is incremented so future unique and human-readable URLs may also be generated (act 409).

If the hash value for the human-readable property matches a hash value in the hash index (YES in decision block 404), yet despite this, the human-readable property itself is not included in an existing URL (NO in decision block 407) as when two different human-readable properties hash into the same hash value, the method proceeds back to the act of using the first predetermined set of rules to generate a unique and human-readable URL. This may include proceeding to act 410 where the method returns to the location in the hash index that was marked in act 406 (act 410). The method then, once again, begins searching the hash index for the hash value of accessed human-readable property (act 403). From act 403, the method proceeds in a manner as previously stated.

Figure 5:
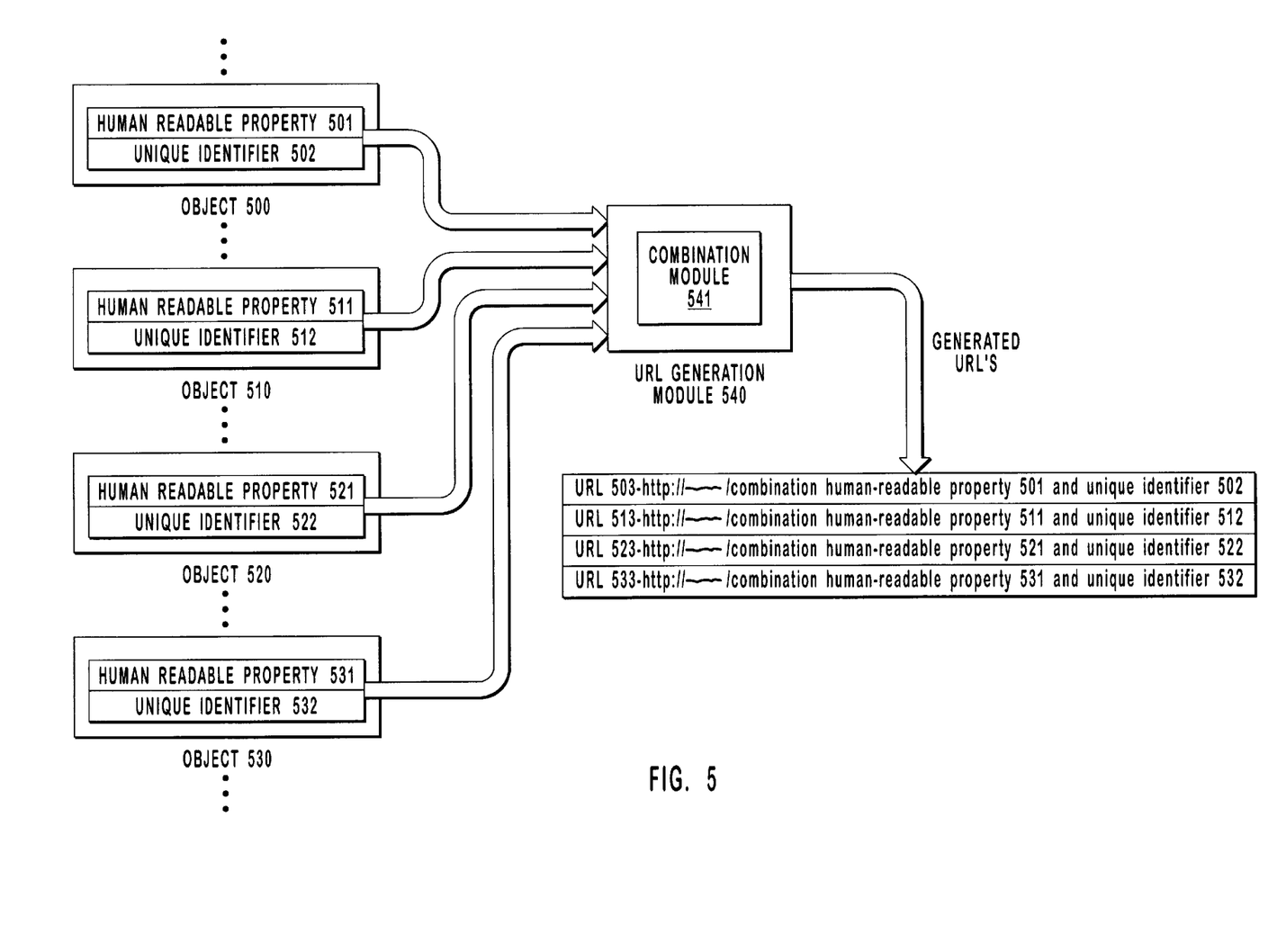
FIG. 5 illustrates some of the functional components present in a system where unique and human-readable URLs are generated for numerous objects within a short period of time.

In another alternative embodiment of the invention, shown in FIG. 5, unique and human-readable URLs must be generated for a plurality of objects within a relatively short period of time. When systems are upgraded or objects are replicated from other systems, it may be the case that these objects were created by an interface or application that is not capable of generating URLs. However, the upgraded systems or interfaces that use the replicated objects may need to access the objects using URLs. When URLs must be generated for a plurality of objects within a short period of time, it is often not efficient use of processor resources or network bandwidth to perform the searches included in the embodiment in FIG. 2.

In this alternative embodiment of FIG. 5, all objects have at least one human-readable property and a unique identifier. Objects 500, 510, 520, and 530 include human-readable properties 501, 511, 521, and 531 and unique identifiers 502, 512, 522 and 532. URL generation module 540 includes combination module 541. Combination module 541 combines human-readable properties and unique identifiers associated with objects to generate unique and human-readable URLs including URLs 503, 513, 523 and 533.

In operation, combination module 541 receives human-readable properties and a unique identifier for a plurality of objects, including objects 500, 510, 520 and 530. Combination module 541 combines the human-readable properties and the unique identifier for each object to create a unique and readable URL. For instance, human-readable readable property 501 and unique identifier 502 (or portions thereof) would be combined to generate unique and human-readable URL 503.

Figure 6:
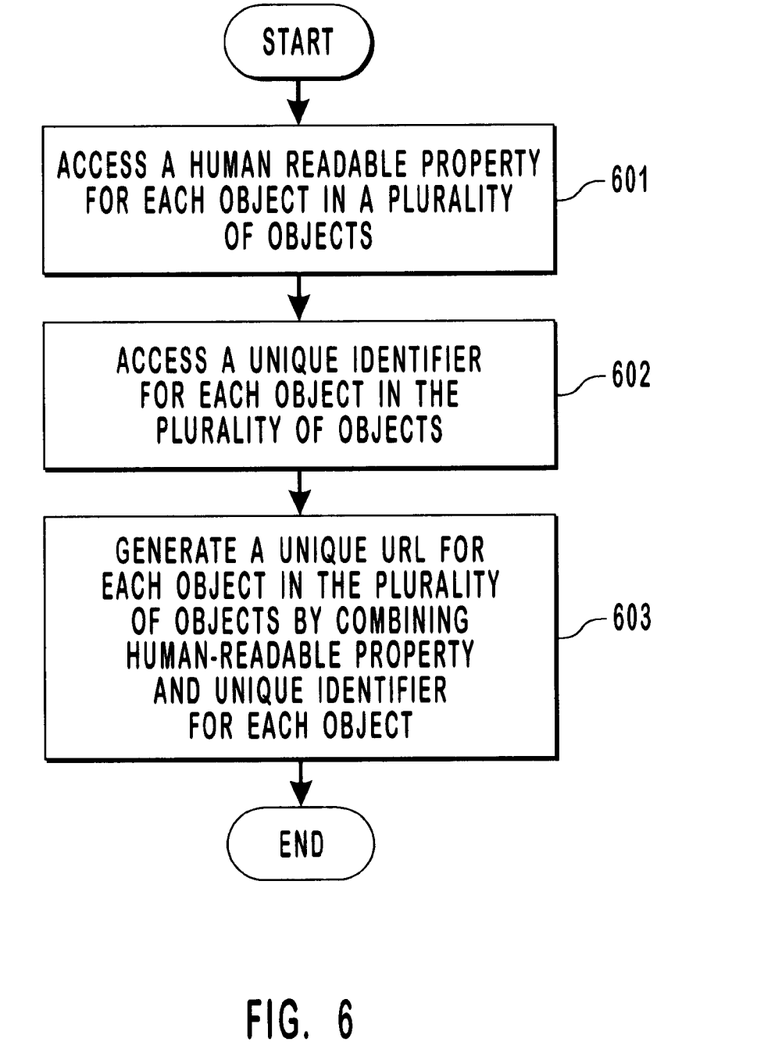
FIG. 6 is a flow diagram illustrating a method of generating unique and human-readable URLs for numerous objects.

FIG. 6 illustrates a flowchart of a method for generating unique and human-readable URLs for a plurality of objects within a short period of time. First, a human-readable property associated with each object in a plurality of objects is accessed (act 601). Then, a unique identifier associated with each object in the plurality of objects is accessed (act 602). In act 603, a unique and human-readable URL is generated for each object in the plurality of objects by combining the human-readable property and the unique identifier for each object. Since a hashing of the human-readable property, and a searching of the hash value are avoided, the method of FIG. 6 may typically be performed faster than methods that involve searching. Therefore, the method of FIG. 6 is more ideally suited for situations such as upgrading and replication in which many objects are to be assigned a URL within a relatively short period of time.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired to be secured by United States Letters Patent is:

1. In a system with objects having one or more associated human-readable properties, a method for generating a unique human-readable URL for an object, the method comprising:

an act of automatically and without user intervention accessing a human-readable property associated with an object that was created by an application which lacked functionality to assign human-readable URLs;

an act of automatically and without user intervention determining whether or not using at least a descriptive portion of the accessed human-readable property results in a unique human-readable URL when the human-readable property is incorporated into the URL according to a first predetermined set of rules; and if the human-readable URL is not unique, an act of automatically and without user intervention incorporating the descriptive portion of the human readable property into the human-readable URL using a second predetermined set of rules, the second predetermined set of rules guarantying that the generated URL is unique yet still human-readable.

2. The method as recited in claim 1, wherein the an act of determining whether or not using at least a descriptive portion of the accessed human-readable property would result in a unique human-readable URL when the human-readable property is incorporated into the URL according to a first predetermined set of rules comprises:

an act of a hash function associating a hash value with the accessed human-readable property; and an act of searching a hash index to determine if the associated hash value is included in the hash index, wherein the hash index includes a plurality of hash values.

3. The method as recited in claim 2, wherein a separately stored postfix is associated with each of the plurality of hash values included in the hash index and wherein the separately stored postfixes are maintained independent of the hash values.

4. The method as recited claim 3, wherein the act of incorporating the descriptive portion of the human-readable property into a human-readable URL using a second predetermined set of rules comprises a specific act of appending a postfix that corresponds to the associated hash value to the descriptive portion of the human-readable property.

5. The method as recited in claim 2, wherein the accessed human-readable property is parsed and wherein the hash function uses only a portion of the accessed human-readable property to associate a hash value with the accessed human-readable property.

6. The method as recited claim 1, wherein the act of incorporating the descriptive portion of the human-readable property into a human-readable URL using a second predetermined set of rules comprises a specific act of appending a postfix to the descriptive portion of the human-readable property.

7. The method as recited in claim 1, wherein the act of incorporating the descriptive portion of the human-readable property into a human-readable URL using a second predetermined set of rules comprises an act of comparing the human-readable URL to a list of the previously generated URLs to determine if the human-readable URL is included the list.

8. The method as recited in claim 7, wherein the act of incorporating the descriptive portion of the human-readable property into a human-readable URL using a second predetermined set of rules further comprises modifying the human-readable URL in a manner that does not effect the human-readable nature of the URL, if the human-readable URL is included in the list of previously generated URLs.

9. The method as recited in claim 8, wherein the act of incorporating the descriptive portion of the human-readable property into a human-readable URL using a second predetermined set of rules further comprises:

an act of modifying the human-readable URL by combining the human-readable URL with a postfix; and an act of modifying the associated postfix to guarantee that future human-readable URLs that are identical to the human-readable URL do not receive the same postfix.

10. The method as recited in claim 9, wherein the associated postfix is associated with a hash value and wherein the hash value is included in a hash index.

11. The method as recited in claim 10, wherein the associated postfix is a number and modifying the associated postfix comprises incrementing the number.

12. A computer program product for implementing, in a system with objects having one or more associated human-readable properties, a method for generating a unique human-readable URL for an object object, the computer product comprising:

a computer-readable medium carrying computer-readable instructions, that when executed at the server system, cause the server system to perform the method, including the following:

an act of automatically and without user intervention causing a human-readable property associated with an object to be accessed, the object having been created by an application that lacked functionality of assign human-readable URLS;

an act of automatically and without user intervention determining whether or not using at least a descriptive portion of the accessed human-readable property results in a unique human-readable URL when the human-readable property is incorporated into the URL according to a first predetermined set of rules; and if the human-readable URL is not unique, an act of automatically and without user intervention incorporating the descriptive portion of the human readable property into the human-readable URL using a second predetermined set of rules, the second set of rules guarantying that the generated URL is unique yet still human-readable.

13. The computer program product as recited in claim 12, wherein the computer-executable instructions for performing the act of determining whether or not using at least a descriptive portion of the accessed human-readable property would result in a unique human-readable URL when the human-readable property is incorporated into the URL according to a first predetermined set of rules comprise computer-executable instructions for performing the following:

an act of a hash function associating a hash value with the accessed human-readable property; and an act of searching a hash index to determine if the associated hash value is included in the hash index, wherein the hash index includes a plurality of hash values.

14. The computer program product as recited claim 12, wherein the computer-executable instructions for performing the act of incorporating the descriptive portion of the human-readable property into a human-readable URL using a second predetermined set of rules comprise computer executable instructions for performing a specific act of appending a postfix to the descriptive portion of the human-readable property.

15. The computer program product as recited in claim 12, wherein the computer-executable instructions for performing the act of incorporating the descriptive portion of the human-readable property into a human-readable URL using a second predetermined set of rules comprises an act of comparing the human-readable URL to a list of the previously generated URLs to determine if the human-readable URL is included the list.

16. In a network system having stored therein a plurality of objects that are not previously identified by human-readable URLs, but by other unique identifiers, one or more of the properties associated with the plurality of stored objects being human-readable, the network system including a plurality of client applications that access objects using URL addressing, a method for efficiently assigning a URL to an object so as to allow the plurality of client applications to access the plurality of objects using URLs and so as to allow a human reader to be able to intuitively identify the object by reading the URL and without having to open the object, the method comprising:

an act of automatically and without user intervention accessing a human-readable property for each of the plurality of objects which have not been identified previously by human-readable URLs;

an act of automatically and without user intervention accessing a unique identifier for each of the plurality of objects; and an act of automatically and without user intervention generating a unique human-readable URL for each of the plurality of objects using a combination of the human-readable property and the unique identifier for each object.

17. The method as recited in claim 16, wherein the at least a plurality of objects is associated with an upgrade of one of the plurality of client applications.

18. The method as recited in claim 17, wherein the at least a plurality of objects are replicated from other objects included on the network system.

19. The method as recited in claim 18, wherein the other objects included on the network system were created by an application that does not support URLs.

20. A computer program product for implementing, in a network system having stored therein a plurality of objects that are not previously identified by human-readable URLs, but by other unique identifiers, one or more of the properties associated with the plurality of stored objects being human-readable, the network system including a plurality of client applications that access objects using URL addressing, a method for efficiently assigning a URL to an object so as to allow the plurality of client applications to access the plurality of objects using URLs and so as to allow a human reader to be able to intuitively identify the object by reading the URL and without having to open the object, the computer product comprising:

a computer-readable medium carrying computer-readable instructions, that when executed at the first server system, cause the first server system to perform the method, including the following:

an act of automatically and without user intervention accessing a human-readable property for each of the plurality of objects with have not been identified previously by human-readable URLs;

an act of automatically and without user intervention accessing a unique identifier for each of the plurality of objects; and     an act of automatically and without user intervention generating a unique human-readable URL for each of the plurality of objects using a combination of the human-readable property and the unique identifier for each object.

\* \* \* \* \*